Figure 1:
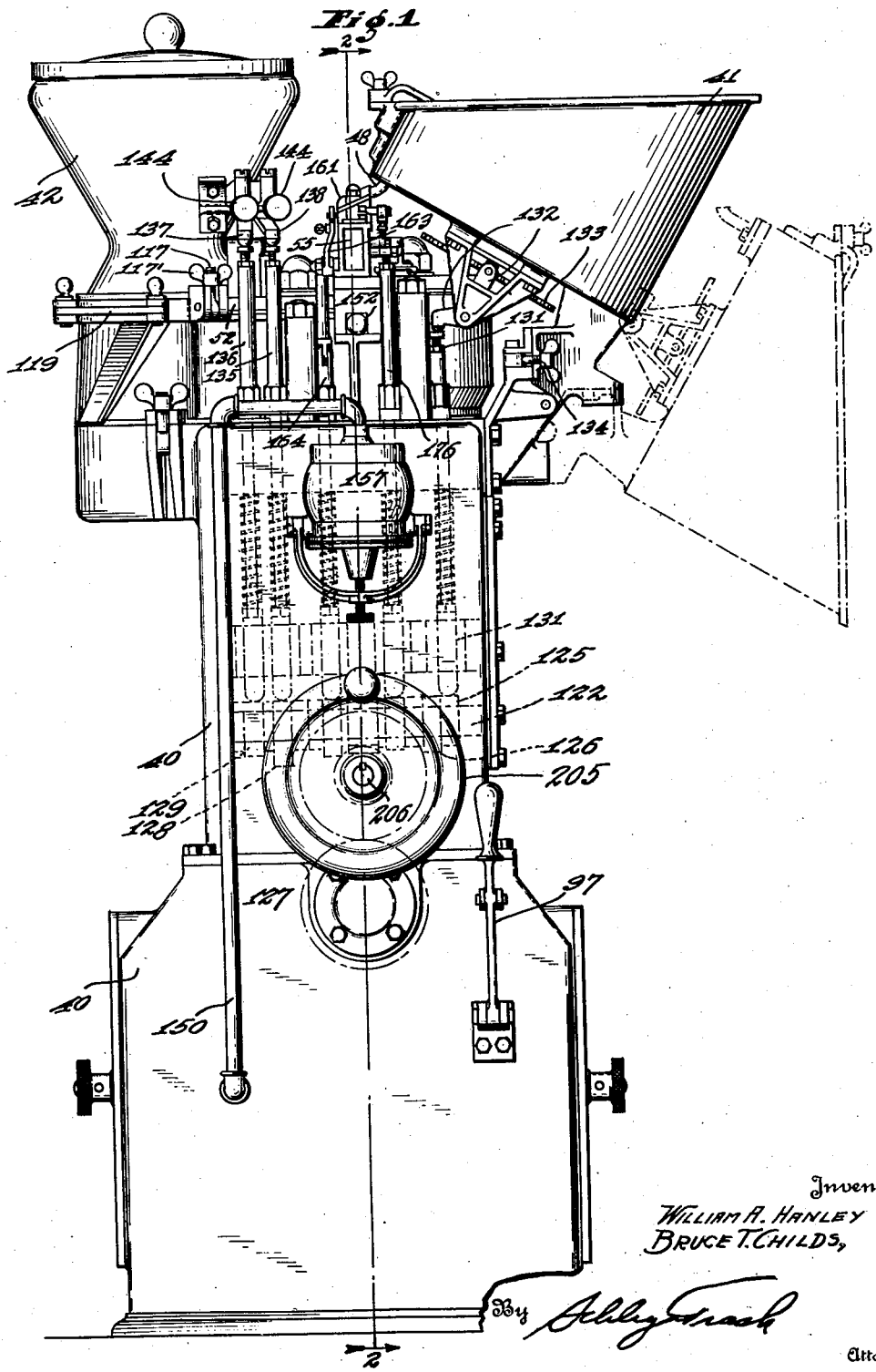

March 5, 1935.  W. A. HANLEY ET AL  1,993,716
CAPSULE FILLING MACHINE
Filed Jan. 2, 1930   13 Sheets-Sheet 1

Inventors
WILLIAM A. HANLEY
BRUCE T. CHILDS,
By
Attorney

March 5, 1935.  W. A. HANLEY ET AL  1,993,716
CAPSULE FILLING MACHINE
Filed Jan. 2, 1930   13 Sheets-Sheet 2

Inventors
WILLIAM A. HANLEY,
BRUCE T. CHILDS
By
Attorney

March 5, 1935. W. A. HANLEY ET AL 1,993,716
CAPSULE FILLING MACHINE
Filed Jan. 2, 1930 13 Sheets-Sheet 3

Inventors
WILLIAM A. HANLEY,
BRUCE T. CHILDS,
By
Attorney

Inventors
WILLIAM A. HANLEY
BRUCE T. CHILDS,
By
Attorneys

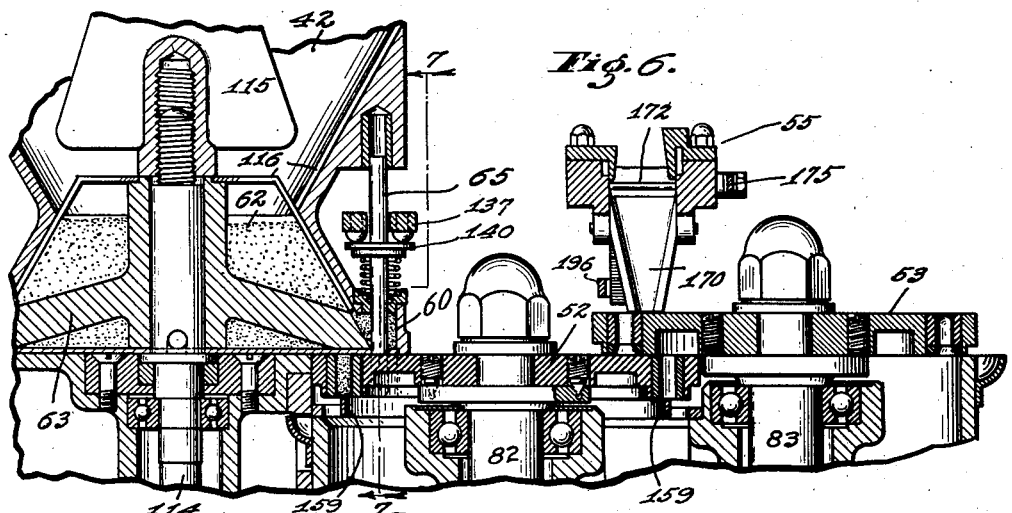
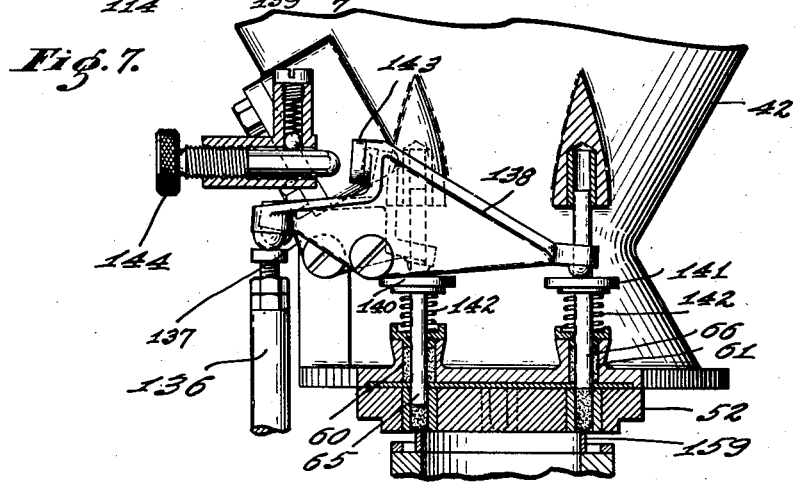
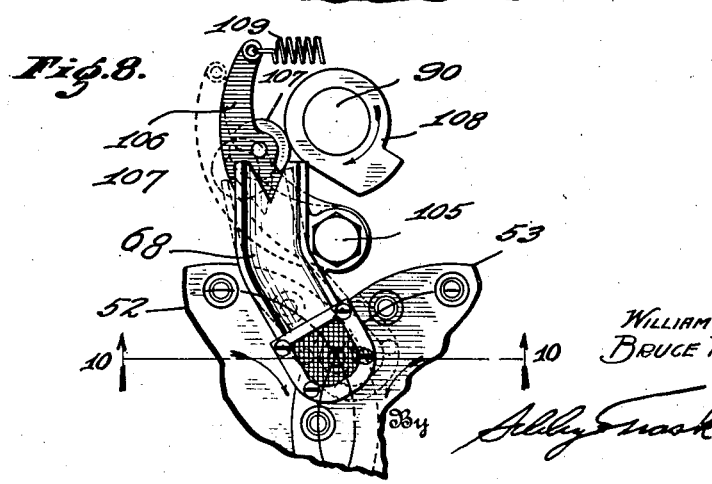

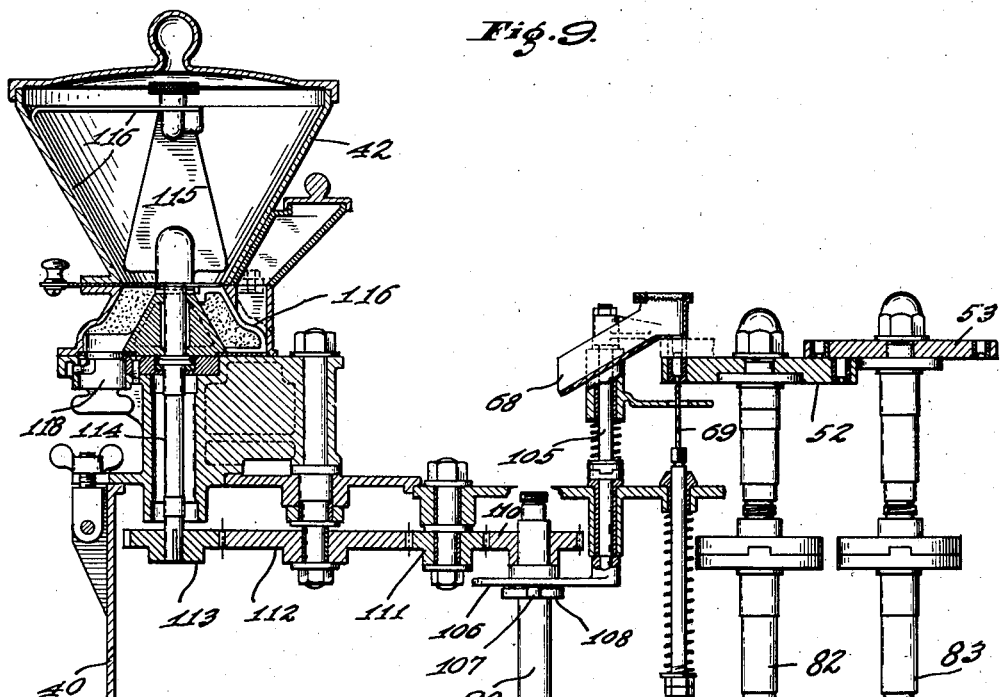
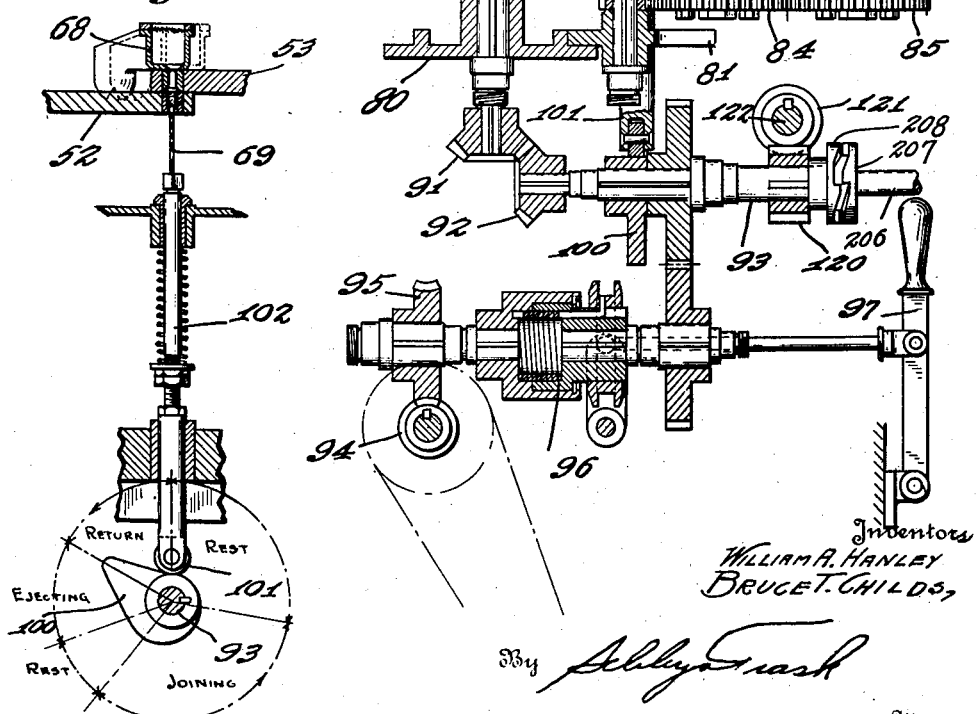

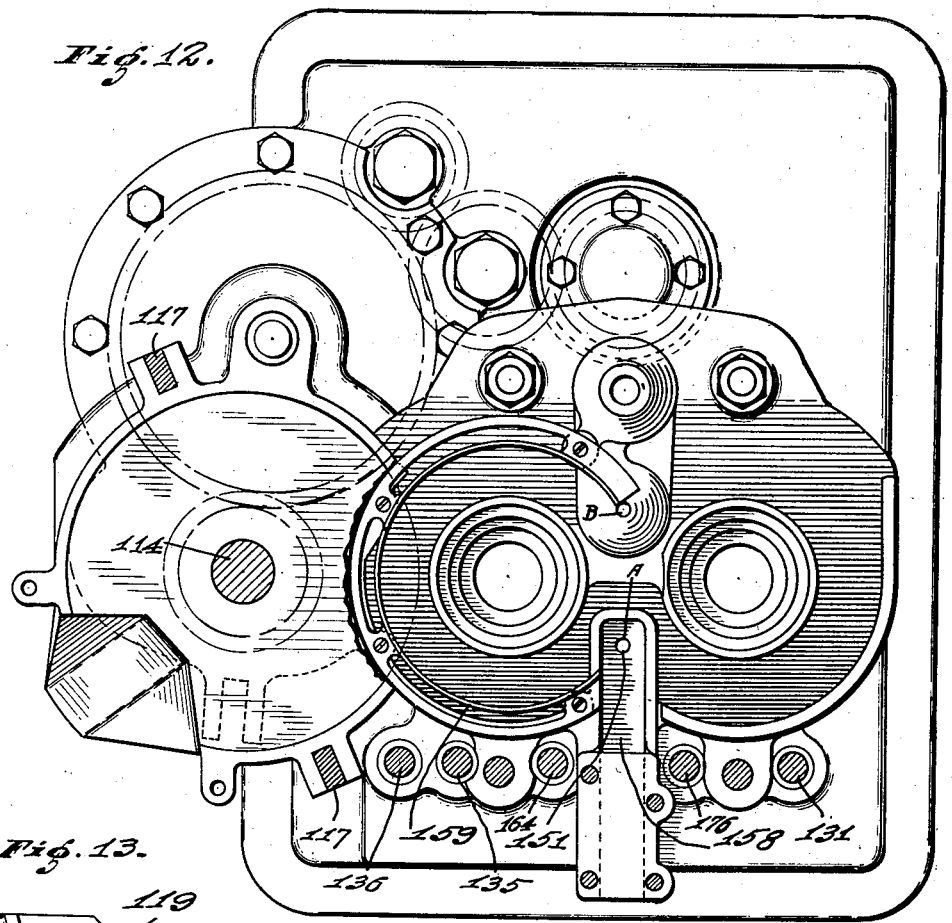
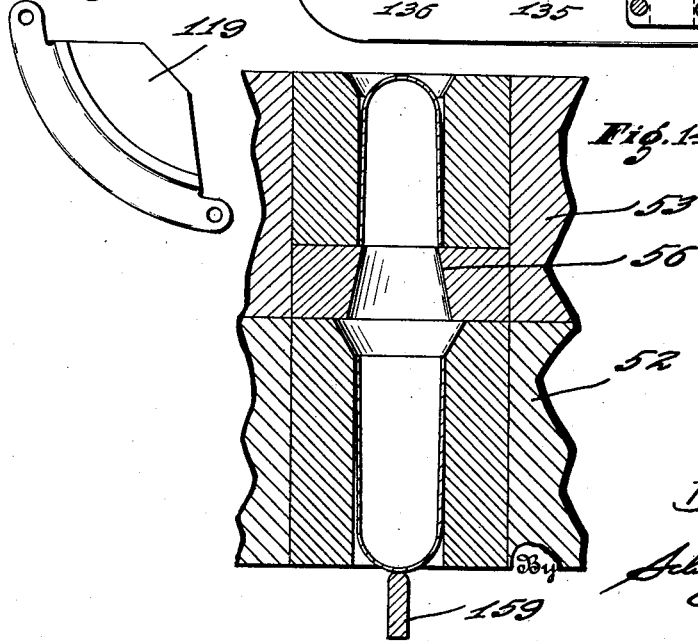

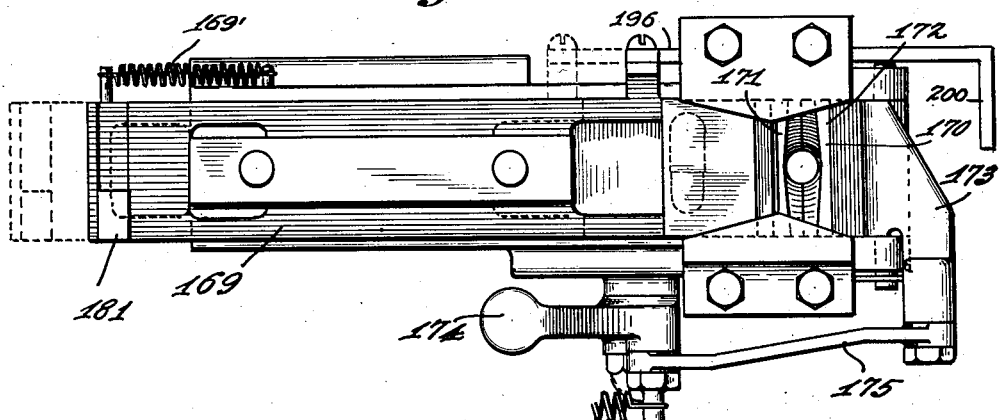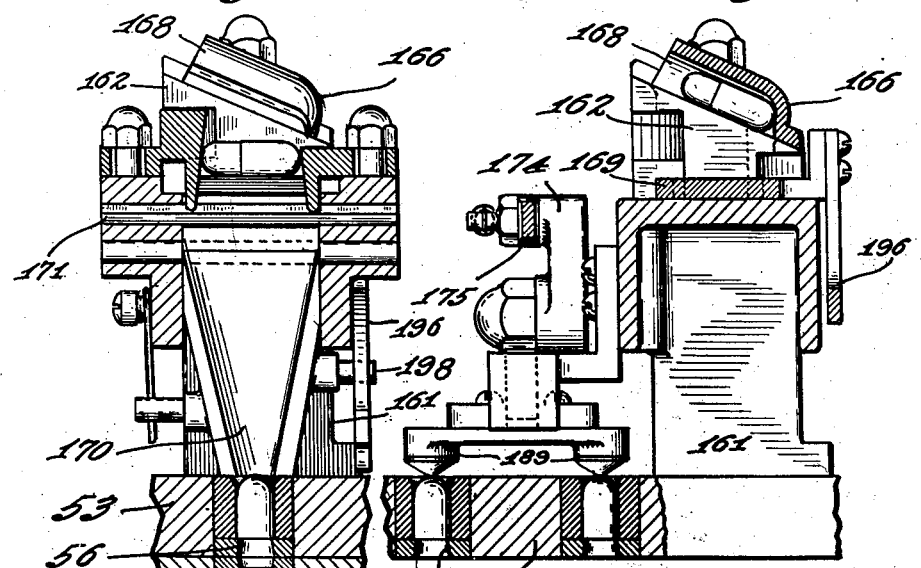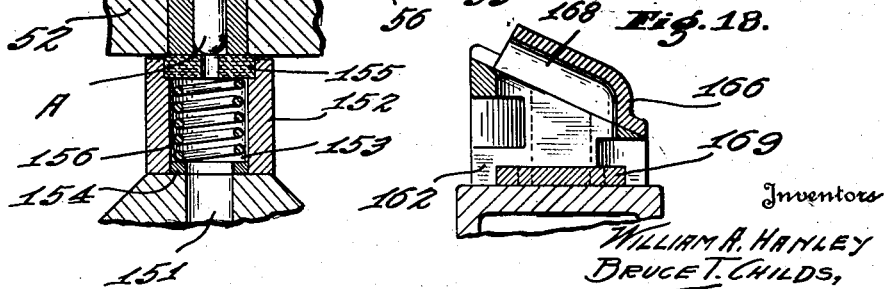

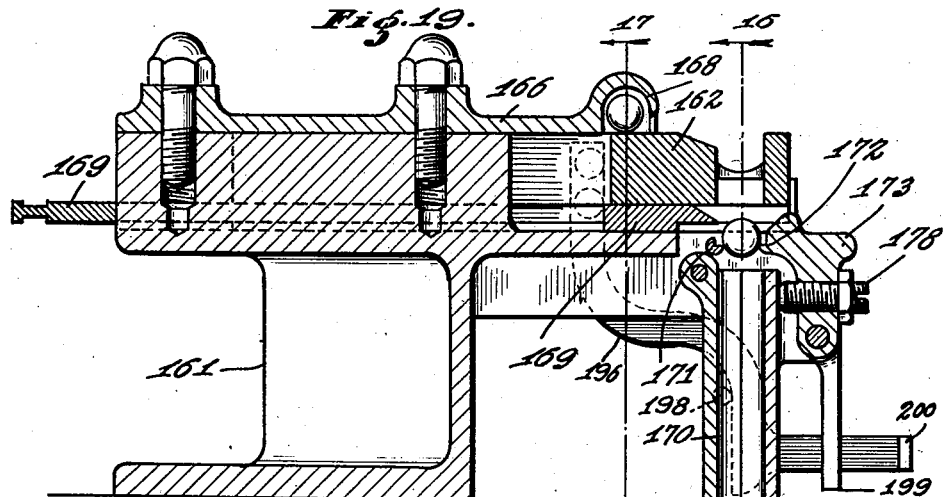
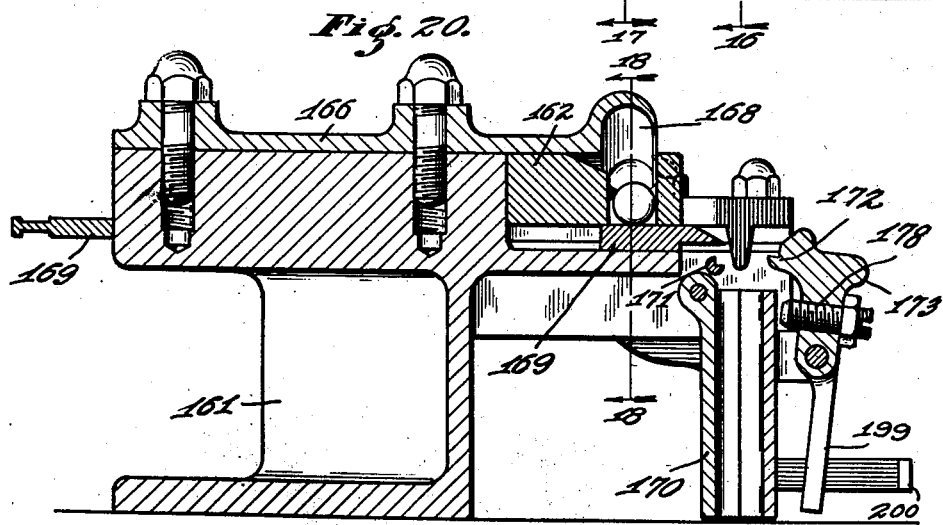
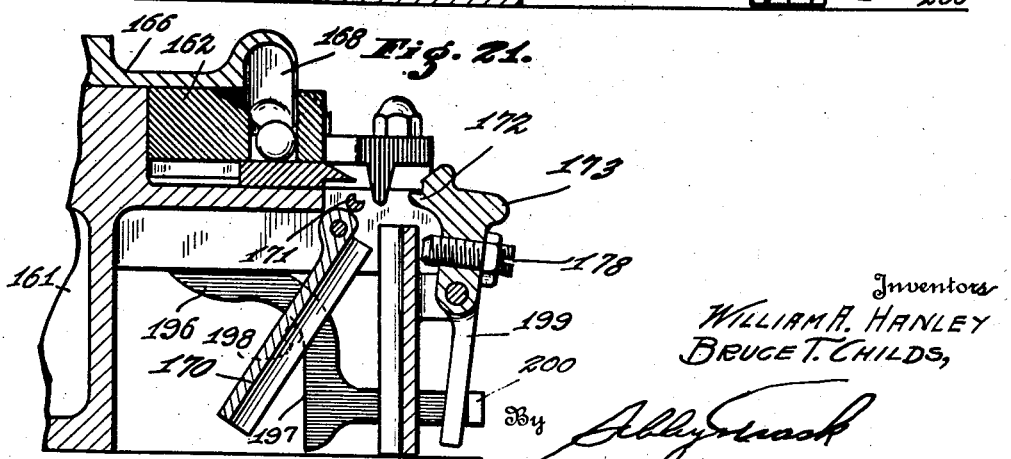

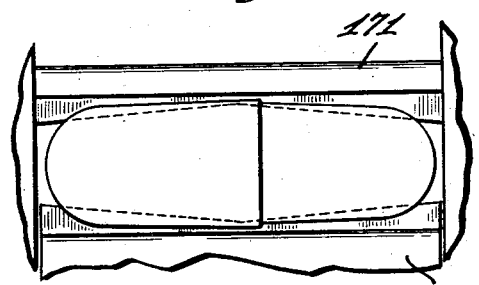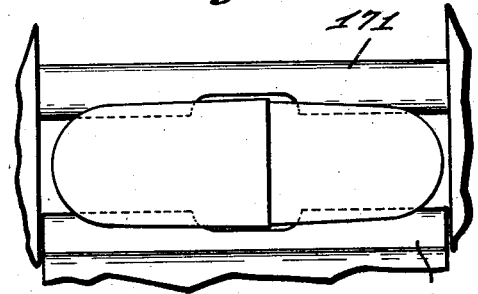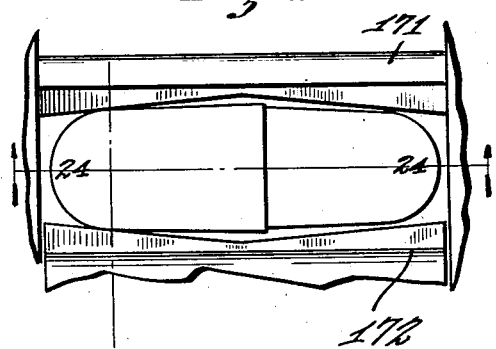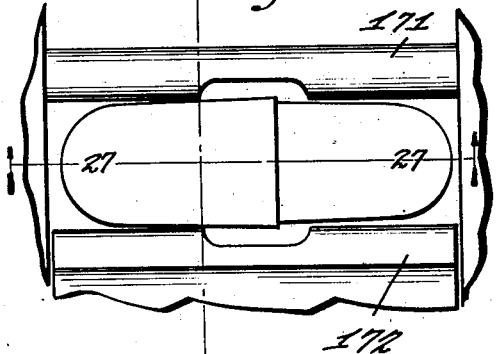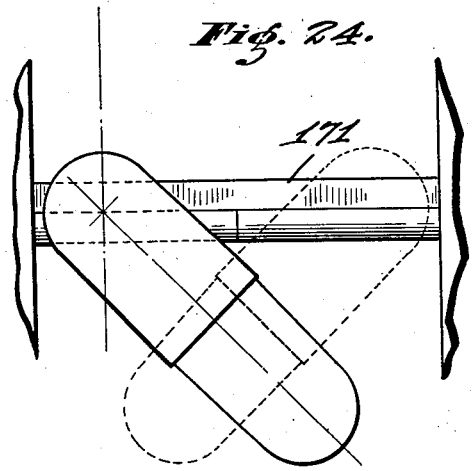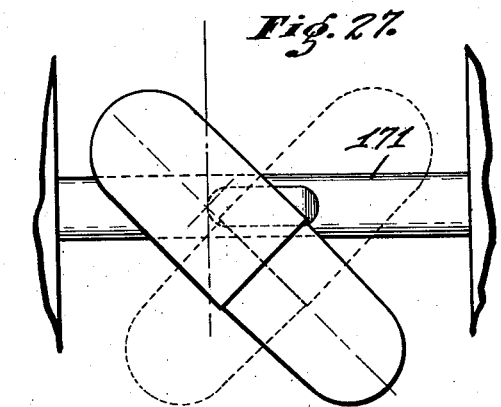

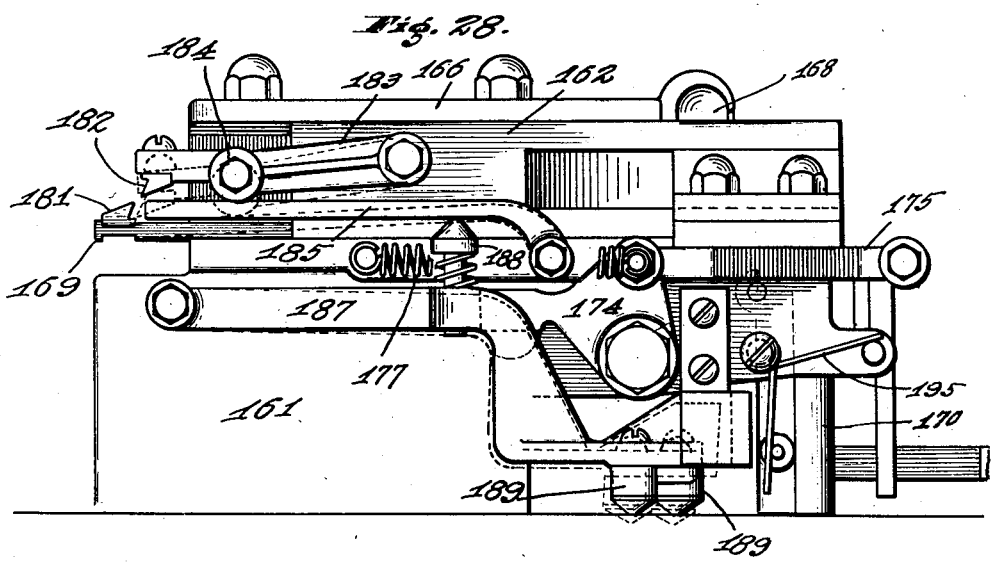
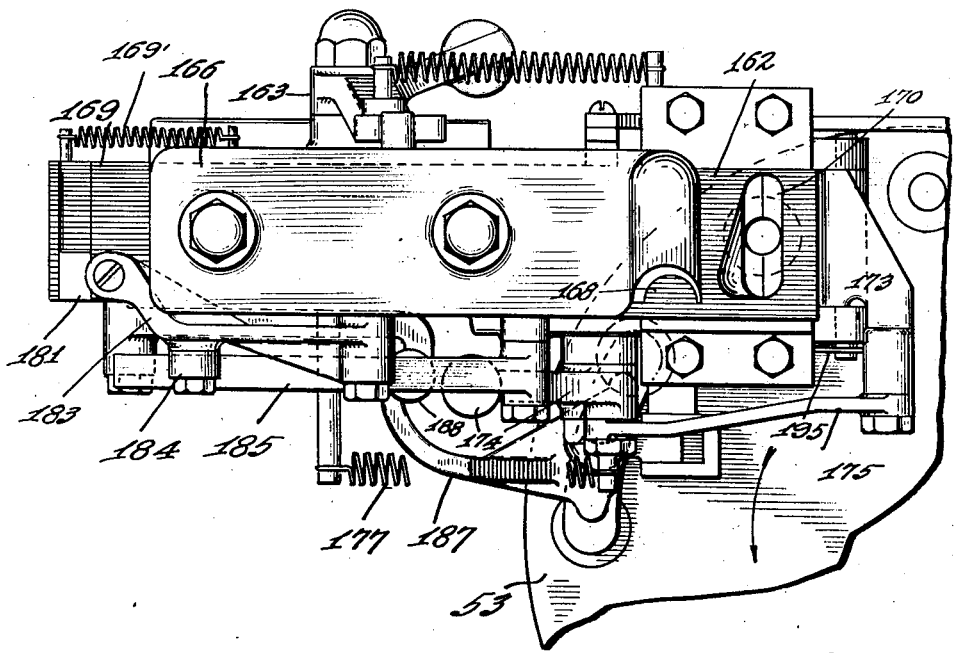

March 5, 1935.  W. A. HANLEY ET AL  1,993,716
CAPSULE FILLING MACHINE
Filed Jan. 2, 1930    13 Sheets-Sheet 13
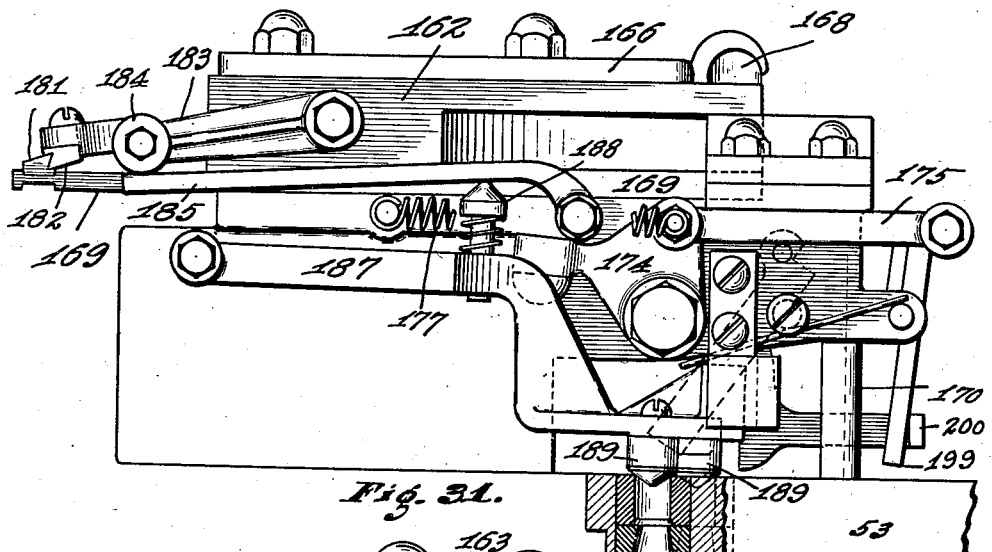
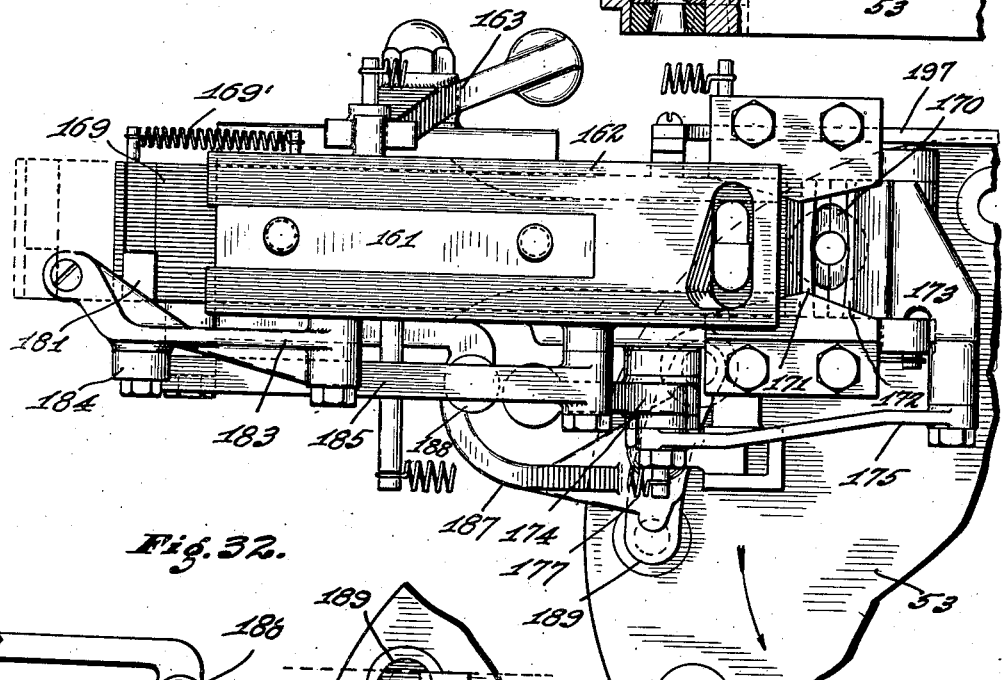
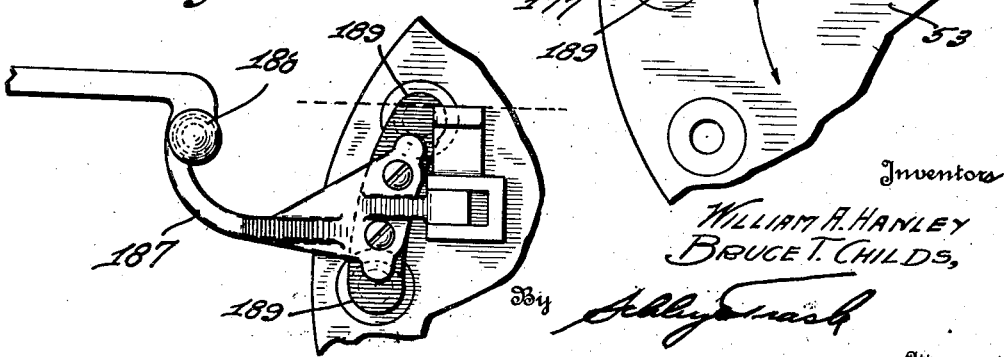
Inventors
WILLIAM A. HANLEY
BRUCE T. CHILDS,
By Ashley Nash
Attorneys Patented Mar. 5, 1935

1,993,716

UNITED STATES PATENT OFFICE 1,993,716

CAPSULE FILLING MACHINE

William A. Hanley and Bruce T. Childs, Indianapolis, Ind., assignors to Eli Lilly and Company, Indianapolis, Ind., a corporation of Indiana Application January 2, 1930, Serial No. 417,935

36 Claims. (Cl. 226—41)

Our invention is concerned with capsule-filling machines, or machines capable of automatically separating the body and cap of the capsule, filling the body with any desired material, and reassembling the body and the cap. It is our object, considered broadly, to improve and simplify the construction of a capsule-filling machine.

More specifically, it is our object to produce an improved device for orienting the capsules in order that they may be disposed in similar positions, to provide a novel means for carrying the bodies and caps of the capsules between the times when they are separated and when they are reassembled, to provide an improved and novel mechanism for accurately filling the capsule-bodies, which filling mechanism may be readily and accurately adjusted to control the quantity of ingredient supplied to each capsule, to provide a simple and effective means for joining the capsules and discharging them from the machine, and to provide mechanism for automatically stopping the machine in event of interruption of the capsule feed.

In carrying out our invention, we provide two index plates disposed on parallel axes displaced from each other, the plates being arranged to overlap. Each of the plates is provided with a circumferential series of holes spaced at equal angular intervals. Means are provided for intermittently rotating the two plates in opposite directions in such a manner that when the plates are at rest two holes in one plate will be alined respectively with two holes in the other plate. At one point where the holes are alined, a capsule is fed to the plates and separated by means which will be hereinafter described, so that the capsule-cap will be in the hole in one plate and the capsule-body will be in the hole in the other plate. During the course of the rotation of the plates from the point at which the body and cap are separated, the body is filled; and when the body and cap again come into line, they are reassembled and discharged from the machine.

Figure 2:
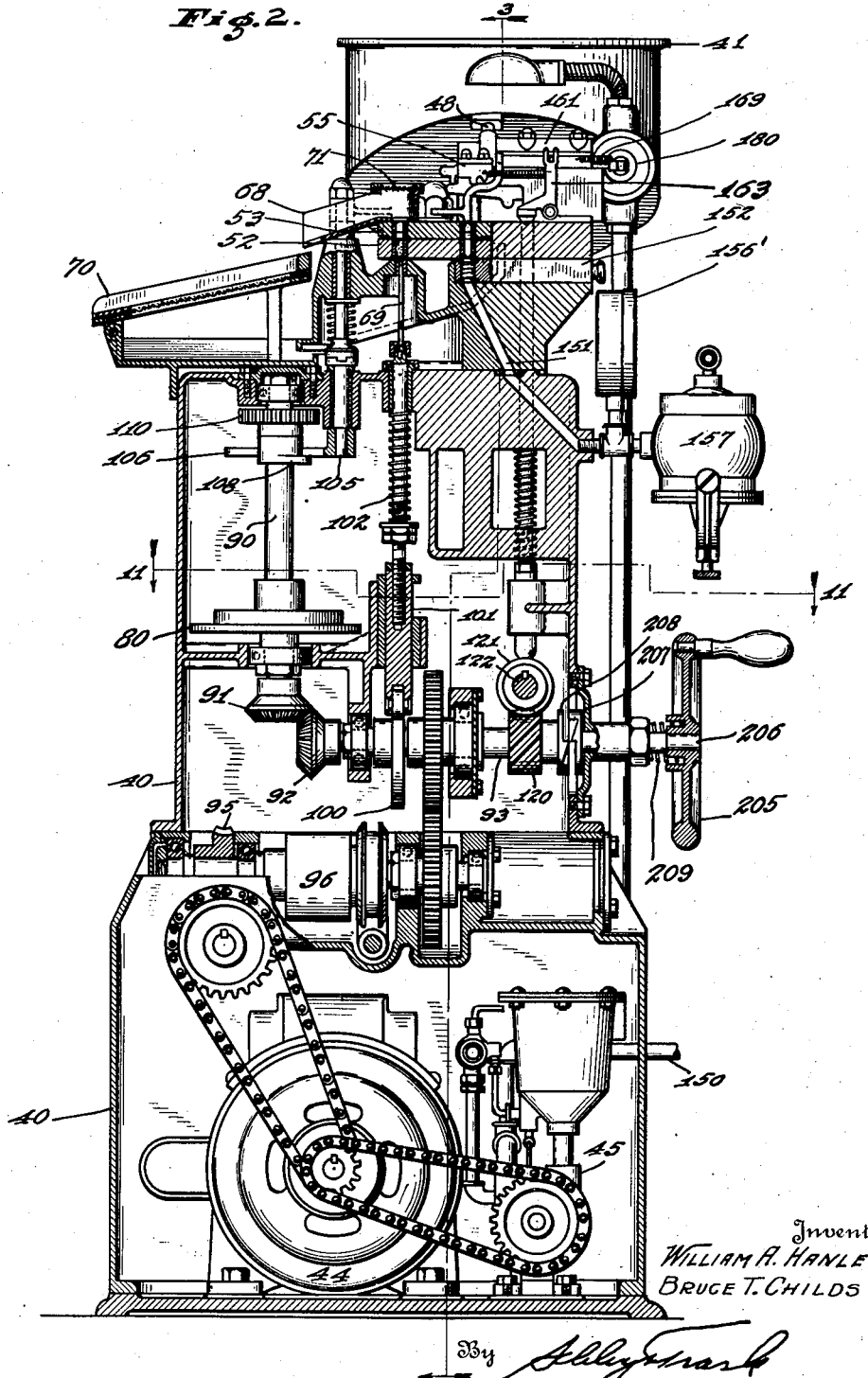
Figure 3:
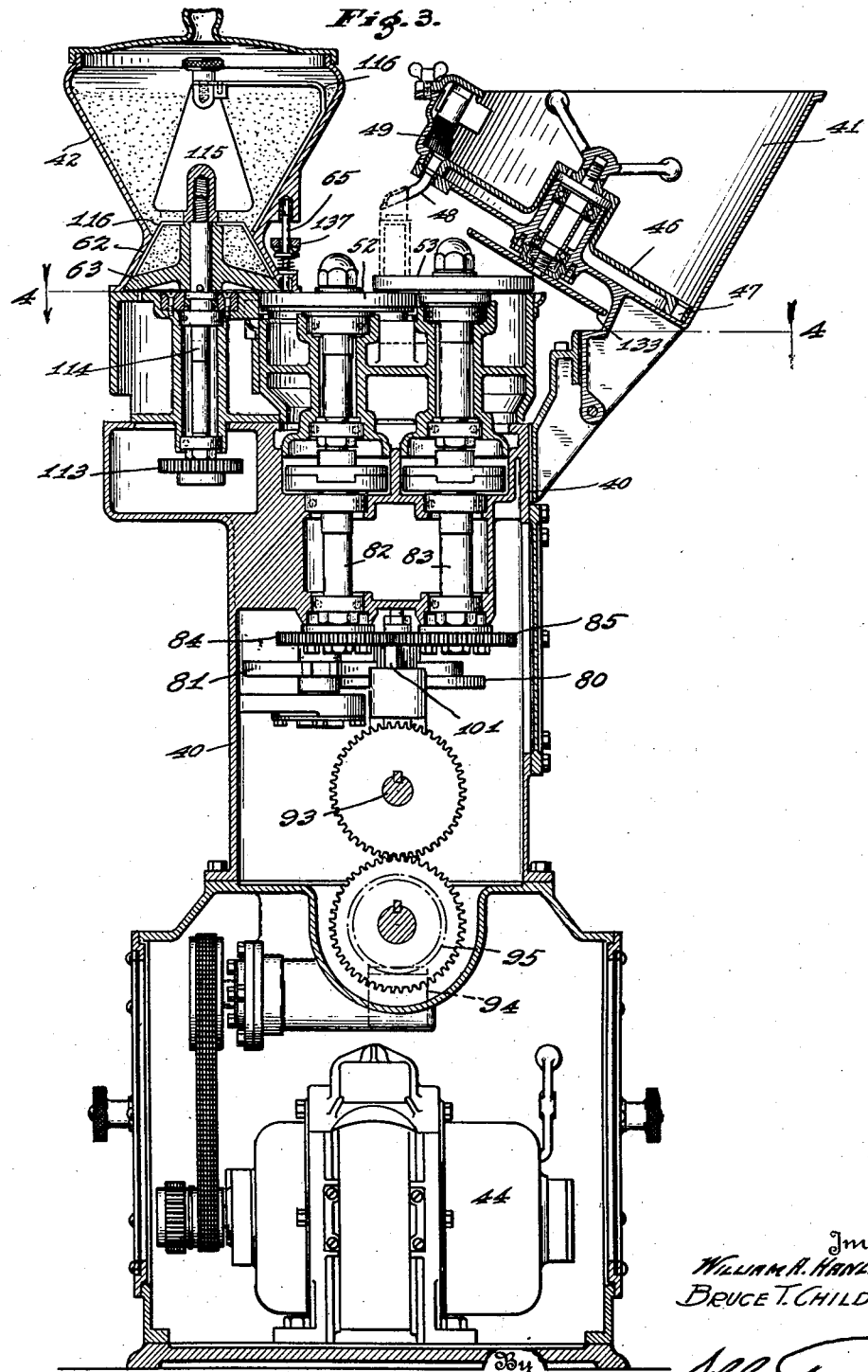
Figure 4:
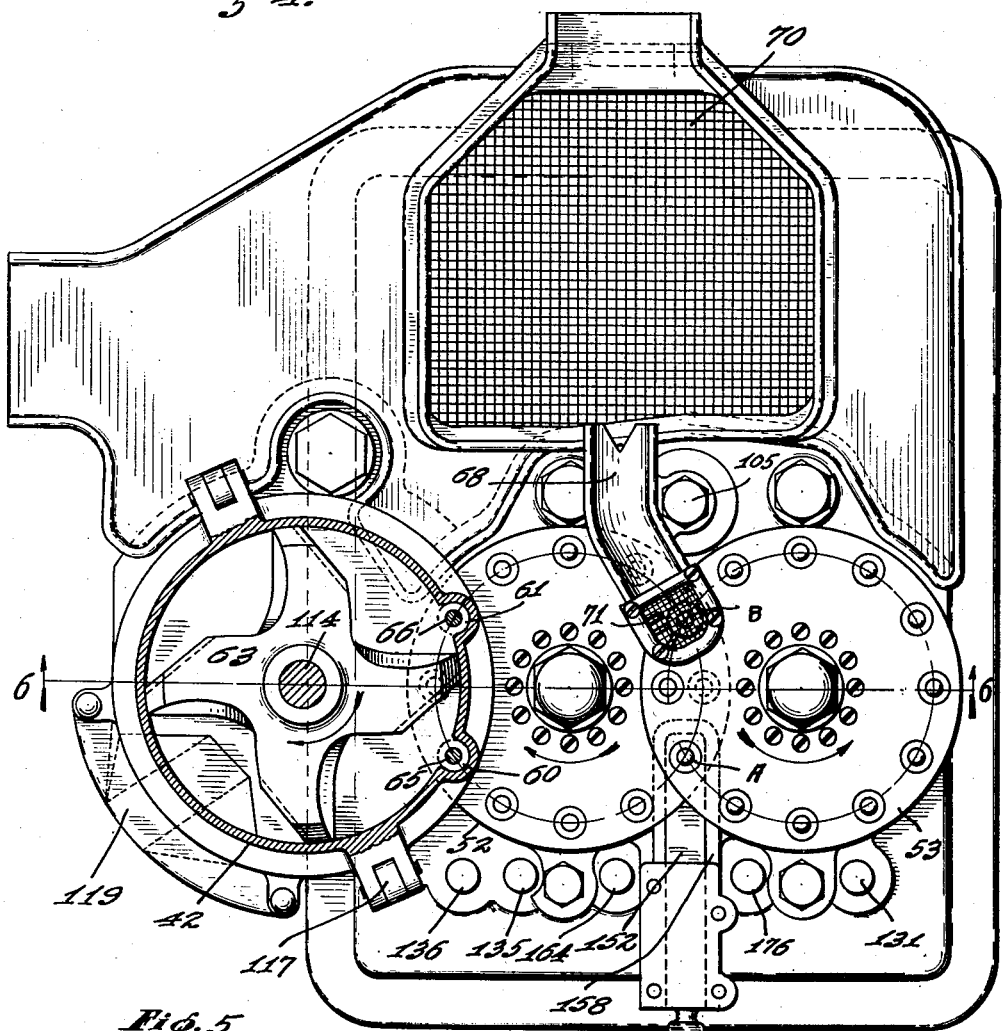
Figure 5:
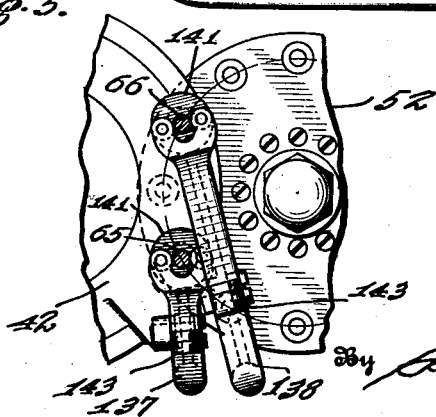
Figure 11:
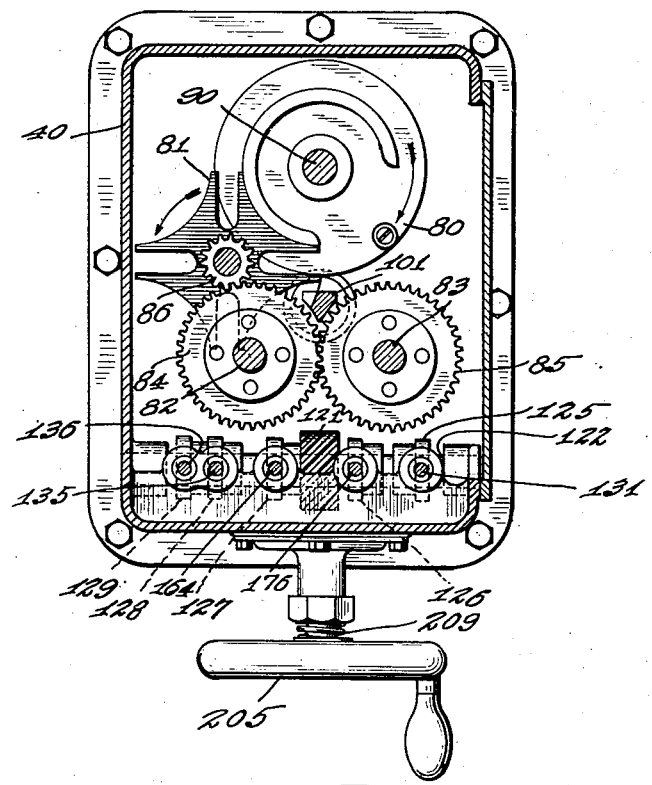
Figure 33:
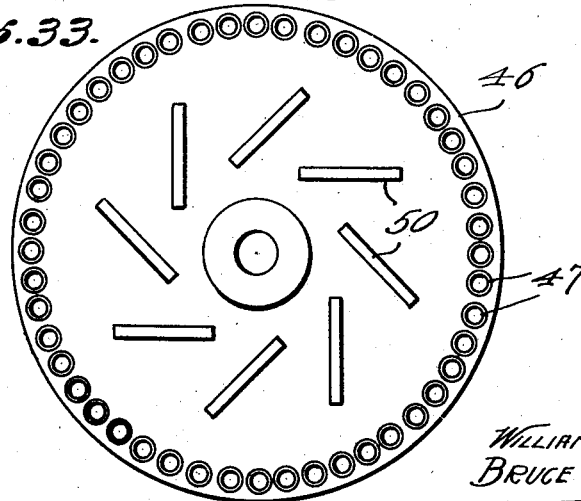

The accompanying drawings illustrate a machine embodying our invention: Fig. 1 is a front elevation of the machine; Fig. 2 is a vertical section on the line 2—2 of Fig. 1; Fig. 3 is a vertical section on the line 3—3 of Fig. 2; Fig. 4 is a horizontal section on the line 4—4 of Fig. 3; Fig. 5 is a fragmental plan view illustrating some details of the means for filling the capsule bodies; Fig. 6 is a fragmental vertical section on the line 6—6 of Fig. 4; Fig. 7 is a fragmental vertical section on the line 7—7 of Fig. 6; Fig. 8 is a fragmental plan view showing some details of a means for assembling and discharging the capsule; Fig. 9 is a somewhat diagrammatic developed section showing operating shafts, gears, etc.; Fig. 10 is a vertical section through the assembling and discharging mechanism; Fig. 11 is a horizontal section on the line 11—11 of Fig. 2; Fig. 12 is a plan view of the base of the machine below the index plates; Fig. 13 is a detail view of a removable closure for the cleaning-opening of the hopper that contains the material with which the capsules are to be filled; Fig. 14 is a fragmental vertical section through the two index plates on the axis of two registering holes; Fig. 15 is a plan view of the capsule-feeding device by means of which the capsules are fed in proper position to the index plates; Figs. 16 and 17 are transverse vertical sections through the feeding device respectively on the lines 16—16 and 17—17 of Fig. 19; Fig. 18 is a fragmental vertical transverse section on the line 18—18 of Fig. 20; Figs. 19 to 21 inclusive are longitudinal vertical sections through the feeding device showing the parts thereof in different positions; Figs. 22 and 23 are enlarged plan views of the gate through which capsules are fed to the index plates and by which the capsules are disposed in proper position; Fig. 24 is a vertical section on the line 24—24 of Fig. 23; Figs. 25 to 27 inclusive are views corresponding respectively to Figs. 22 to 24 inclusive showing a modified form of gate; Figs. 28 and 29 respectively are a side elevation and a top plan of the capsule-feeding device; Fig. 30 is a view similar to Fig. 28, but showing the parts in different positions; Fig. 31 is a view similar to Fig. 15, but showing the parts in different positions; Fig. 32 is a fragmental plan of a detail of construction; and Fig. 33 is a plan of the plate by means of which assembled capsules are fed from the hopper in which they are contained.

The machine shown in the drawings comprises a hollow base 40 which supports two hoppers 41 and 42, the hopper 41 being designed to contain unfilled capsules and the hopper 42 being intended to contain the material with which the capsules are to be filled. Within the hollow base 40 there may be mounted an electric motor 44 which drives a vacuum pump 45 and operates the moving parts of the machine.

The bottom of the capsule hopper 41 is inclined to the horizontal, and within the hopper and adjacent the bottom thereof we provide a rotatable plate 46 which rotates in a plane substantially parallel to the hopper-bottom. The plate 46 is provided with a circumferential series of holes 47, each of which is slightly larger than the outer diameter of the capsules with which the hopper 41 is to be filled. It is intended that the hopper will contain a supply of capsules sufficient to cover approximately the lower half of the plate 46, the plate near its top being substantially free from capsules. As the plate rotates, capsules are received in the holes 47, which are desirably slightly bell-mouthed, and are carried to the top of the plate where they drop through an opening in the hopper bottom into a feed chute 49. Desirably, a brush 49 is mounted above the plate 46 in position to prevent more than one capsule from dropping into the feed chute 48 at any one time. To facilitate the disposing of capsules in the holes 47, the upper face of the plate 46 may be provided with a series of ribs 50 (Fig. 33) which carry the capsules upward as the disk rotates and then permits them to drop back over the surface of the plate.

The index plates which have been above referred to are mounted below the feed chute 48 and comprise two rotatable disks 52 and 53. These disks are provided with a corresponding number of equally-spaced capsule-receiving holes arranged in a series around the peripheries of the respective disks. As shown, each disk contains twelve (12) capsule-receiving holes.

The disks 52 and 53 are rotatable about vertical axes which are spaced from each other a distance such that two of the holes in the disks 53 may simultaneously coincide with two of the holes in the disk 52 as indicated at A and B (Fig. 4). Means which will be described in detail hereinafter are provided for intermittently rotating the disks 52 and 53 in opposite directions in such a manner that they come to rest with two holes in each disk alined with two holes in the other disk.

After leaving the feed chute 48, and before reaching the index plates 52 and 53, the capsules pass through a feeding device 55 which disposes them in such a manner that when they enter the upper index plate 53 their caps will all be toward the top. The feeding device 55 delivers the capsules successively to two alined index-plate holes at the position A. Each of the capsule-receiving holes in the upper disk 53 is of a diameter sufficient to receive the capsule-cap, but is restricted near its lower end to provide a shoulder 56 against which the lower end of the cap may abut. (See Fig. 16.) With the lower end of the cap resting against the shoulder 56 and the capsule-body extending into the capsule-receiving hole in the lower plate 52, and before any movement of the index plates occurs, suction is applied to the hole in the plate 52 and the capsule-body is withdrawn from its associated cap into the position indicated in Fig. 16. After this operation has been completed, the two plates 52 and 53 are rotated in opposite directions to bring two more capsule-receiving holes to the position A and another capsule is delivered and separated as before.

The intermittent rotation of the two plates 52 and 53 carries the capsule-bodies and caps over independent paths and returns them successively to the position B where each body and cap are re-assembled and ejected.

During the passage of the capsule-bodies from the position A to position B by the rotation of the disk 52, they pass successively below two feeding pockets 60 and 61 associated with the hopper 42. From Fig. 4 it will be evident that the feeding pockets 60 and 61 open laterally from a feeding chamber 62 at the bottom of the hopper 42. Within the feeding chamber 62 there is a rotatable spider 63, which, as it rotates, forces the material in the feeding chamber 62 outwardly into the feeding pockets 60 and 61. These two pockets are so spaced that they are directly above two of the capsule bodies during the periods when the disk 52 is at rest. Vertically reciprocable tampers 65 and 66 operate respectively in the pockets 60 and 61 and serve to force the material in such pockets downwardly into the capsule bodies located respectively therebelow. (See Fig. 7.)

After each capsule-body is filled, it is carried by the intermittent rotation of the disk 52 to position B, where it comes below the cap with which it was originally associated, which cap has been carried around by the intermittent rotation of the disk 53.

Immediately above the point B where the filled-capsule body comes into line with its cap is a discharge trough and below such point is a vertically reciprocable capsule-closing and ejecting member 69. In the bottom of the trough 68 there is an opening through which capsules discharged from the index plates may pass, but the trough 68 normally occupies a position (indicated in dotted lines in Figs. 8 and 10) such that the hole in the bottom of the trough is not in line with the capsule. With the trough in this position, the member 69 is elevated to force the body into the cap. Thereafter, the trough is moved laterally to the full-line positions shown in Figs. 8 and 10 to bring the hole in the trough-bottom into line with the capsule; and subsequent to such movement of the trough, the member 69 moves further upward and forces the capsule out of the plate 53 and into the trough, which again returns to its normal position. The capsule, after being received in the trough 68 is discharged on to a tray 70. Desirably, the trough 68 is provided above the hole in its bottom with a screen 71 which prevents a capsule from being forced completely out of the trough by the operation of the discharge member 69.

Intermittent gearing by means of which a step-by-step movement is imparted to the two index plates 52 and 53 is conveniently located with other operating mechanism within the hollow base. This intermittent gearing may take any desired form, but we prefer to employ the Geneva movement illustrated in Fig. 11 of the drawings. This movement comprises a constantly rotating driving member 80 adapted during one-quarter revolution to rotate a driven member 81 through one-quarter revolution. During the remaining three-quarters of each revolution of the driving member 80, the driven member 81 is stationary. The two index plates 52 and 53 are mounted respectively on vertical shafts 82 and 83 operatively interconnected by means of two gears 84 and 85 which are of equal diameter and which mesh with each other. One of these gears, here shown as the gear 84, meshes with a pinion 86 that is rotatable with the driven element 81 of the Geneva movement. As there are twelve (12) capsule-receiving holes in each of the index plates 52 and 53, and as the driven element 81 of the Geneva movement rotates a quarter-turn at a time, the gear 86 is one-third (1/3) the size of the gear 84; so that for each revolution of the driving element 80 of the Geneva movement, the disks 52 and 53 are rotated one-twelfth (1/12) of a turn.

The driving element 80 of the Geneva movement may be mounted upon a vertical shaft 90 which is driven, as through the mitre gears 91 and 92, from a countershaft 93, which is in turn driven from the electric motor 44. The drive for the countershaft 93 is desirably through speed-reducing gearing 94—95 and through a releasable clutch 96 controlled by an operating lever 97 located on the outside of the base 40.

For the purpose of operating the capsule-assembling and discharging member 69, we may mount on the shaft 93 a cam 100 having the general shape illustrated in Fig. 10. A cam follower 101 is associated with the cam 100 and operatively connected with the reciprocable member 69. As shown in Fig. 10, the cam 100 is a plain, single-lobed cam, and the cam follower is held in engagement with it by means of a spring 102. This construction may be varied if desired.

During the time when the index plates 52 and 53 are moving from one position of rest to another, the member 69 and the cam follower 101 are at rest in their lower positions. Immediately after the two index plates 52 and 53 have come to rest, however, the cam follower 101 and the member 69 are raised to join the capsule. After this joining movement, there is a second period of rest during which the trough 68 is moved laterally as above set forth to bring the opening in its bottom into line with the capsule. After the trough has reached this position, the follower 101 and member 69 are raised further to eject the capsule, and are thereafter returned to their normal position.

For the purpose of oscillating the trough 68 it may be mounted upon a vertical rock-shaft 105, and the rock-shaft 105 may have rigid with it a laterally extending arm 106 which carries a cam roller 107 adapted to co-operate with a single-lobed cam 108 on the shaft 90. A spring 109 serves to hold the roller 107 in engagement with the cam 108 and tends to cause the trough 88 to occupy the full-line position shown in Figs. 8 and 10. The cam 108 is timed so that its lobe engages the roller 107 to move the trough 88 to its dotted-line position (Figs. 8 and 10) just prior to the upward movement of the rod 69 which joins the capsule-body and cap. After such joining movement, and before the ejecting movement of the rod 69 occurs, the trough 68 is again returned to its full line position to permit the entrance of the ejected capsule.

The shaft 90, in addition to carrying the driving member 80 of the Geneva movement and the cam 108, may also carry a gear 110 which, through idler gears 111 and 112, may drive a gear 113 mounted on a shaft 114 which carries the spider 63 above referred to. (See Fig. 9.) In addition to the spider 63, the shaft 114 may also carry agitating members 115 and 116, the purpose of which is to insure that the feeding pocket 62 will at all times be filled with the powdered material which is to be used in filling the capsules.

The hopper 42, which contains the material with which the capsules are to be filled, is desirably removable from the machine and is held in place thereon by means of the bolts 117 and wing-nuts 117' (Fig. 1). For the purpose of emptying the hopper 42 without removing it from the machine, we may provide an opening in the floor of the pocket 62. During the operation of the machine, this opening will be closed as by means of the plug 118 (Fig. 9) or the plate 119 (Figs. 1 and 13).

Within the base, and conveniently driven through spiral gears 120 and 121, we provide a cam shaft 122 adapted to carry cams which serve to operate the tampers 65 and 66 and the feed device 55, and also to rotate the capsule feed-plate 46. (See Figs. 1, 9, and 11.) As illustrated in Fig. 11, there are five of such cams. The cam 125 at the right of Fig. 11 operates the capsule feed-plate 46. The next two cams 126 and 127 operate the feed device 55, and the next two cams 128 and 129 operate the tampers 65 and 66. As shown in the drawings, the cams 125, 126, 127, 128, and 129 are all plain cams with spring-pressed cam-followers, but if desired box cams may be used and the spring eliminated Desirably, the cam shaft 122 rotates at the same speed as do the shafts 90 and 93, and it therefore makes one revolution for each capsule that is filled. The cam 125 may therefore be a single-lobed cam adapted to reciprocate vertically a push-rod 131.

The upper end of the push-rod 131 bears against one arm of a bell-crank 132, the other end of which carries a spring-actuated pawl associated with a ratchet disk 133 that is rotatable with the capsule-feed plate 46. The number of teeth in the ratchet 133 corresponds to the number of capsule-receiving holes in the feed plate 46, so that for every reciprocation of the push-rod 131, the plate 46 moves angularly to supply a capsule to the feed-chute 48.

The hopper 41, which contains the capsules to be filled, is desirably removable from operative position to afford ready access to the parts beneath it. To this end, it may be pivoted to the base 40 of the machine in such a manner that it can be swung from the operative position shown in full-lines (Fig. 1) to the position shown in dotted lines. Bolts 134 serve normally to hold the hopper in operative position.

The tampers 65 and 66, by means of which the capsule-bodies are filled, are operated from the two cams 128 and 129. To this end, these cams have respectively associated with them push rods 135 and 136 the upper ends of which bear respectively against the ends of pivotally mounted oscillatable arms 137 and 138. The opposite ends of the two pivoted levers 137 and 138 co-operate with the tampers 65 and 66 to cause their vertical reciprocation. For this purpose, the tamper 65 is provided with a shoulder or collar 140, and the tamper 66 is provided with a similar shoulder or collar 141, upon which collars ends of the levers 137 and 138 respectively rest. Springs 142, conveniently located below the collars and bearing against their lower surfaces, tend to force the tampers 65 and 66 upwardly, but upward movement of the tampers is limited by means of suitable stops associated with the levers 137 and 138.

The stops which limit movement of the levers 137 and 138 are conveniently shoulders 143 on such levers. With each shoulder 143 there is associated an adjustable stop-screw 144 which serves to engage the shoulder to limit upward movement of the tampers 65 and 66.

The cams 128 and 129, which cause reciprocation of the push rods 135 and 136, may be multi-lobed cams in order that each of the tampers may make a plurality of reciprocations in filling each capsule-body. The adjusting screws 144, by limiting upward movement of the tampers, control the amount of material which is fed to each capsule-body. These adjusting screws 144 provide a convenient and accurate means for controlling the amount of ingredient supplied to each capsule. They can be adjusted while the machine is running, and it therefore is not necessary to stop the machine to vary the weight of the ingredient supplied to each capsule.

The reduced pressure which is employed to separate the capsule-body from the capsule-cap at the position A is created by the pump 45. To this end, the inlet opening of the pump is connected by a pipe 150 to a passage 151 which opens immediately below the position A in which the two parts of the capsules are separated from each other (see Fig. 2). Mounted above the opening of the passage 151, we provide a slide 152 which has extending through it a hole 153 adapted to overlie the opening of the passage 151 when the slide is in operative position. At the opposite ends of the hole 153, we provide washers 154 and 155, between which a compression spring 156 acts to force the washer 154 into engagement with the frame of the machine immediately surrounding the opening of the passage 151 and to force the washer 155 upwardly into engagement with the lower surface of the lower disk 52. Both washers are provided with central openings in order to effect communication between the passage 151 and the capsule-receiving hole in the plate 52.

It will be apparent that when a capsule is dropped into the capsule-receiving holes in the disks 52 and 53 air flow through such holes and into the passage 151 will be practically shut off. The resultant differential pressure created causes the capsule-body to be drawn downwardly out of association with the cap and into the hole in the disk 52.

The pipe 150, by means of which the passage 151 is connected to the vacuum pump 45, may contain a vacuum gauge 156' and a strainer or filter 157 which prevents any powdered material from being drawn into the pump.

The slide 152 is removable from its operative position as by being mounted in a guide way 158 formed in the body of the machine. (See Figs. 4 and 12.) When the slide is in its inner position, the hole 153 is in alinement with the opening of the passage 151 and with the two capsule-receiving holes at the position A. The slide may be withdrawn from its operative position to permit inspection or replacement of the washers 154 and 155.

During movement of the plate 52 from one position to the next, the washer 155 bears against the lower surface of such plate and no air is permitted to enter the passage 151. To prevent the capsule-bodies from dropping out of the hole in the index plate 52, we provide below such plate and on the pitch line of the capsule-receiving holes a supporting track 159 upon which the lower ends of the capsule-bodies rest. This track is interrupted between positions A and B, as is clear from Fig. 12.

The feeding device, by means of which the capsules are fed to the index plates at position A is illustrated in detail in Figs. 15 to 32 inclusive. It comprises a body 161 adapted to be secured to the frame of the machine. Horizontally reciprocable in the body 161, we provide a slide 162 adapted to be reciprocated periodically as by means of a bell-crank 163 operated through a push rod 164 from the cam 127. Above the slide 162, there is mounted a cap 166, which is secured to the body 161.

The upper surface of the slide 162 is inclined laterally, as is clear from Figs. 16 and 17, and the lower surface of the cap 166 conforms to such inclination. In the cap, we provide a capsule-receiving recess 168 into which capsules are discharged from the feeding chute 48.

Extending vertically through the slide 162 is an opening through which capsules may drop onto the floor-plate 169. In the reciprocation of the slide 162, this opening is moved between a position in which it is immediately below the capsule-receiving recess 168 (Figs. 18 and 20) and a position in which it is beyond the end of the floor-plate 169 (Figs. 16 and 19). When a capsule enters the recess 168, the slide 162 is in its advanced position, as indicated in Fig. 19; and the capsule rests upon the upper surface of the slide 162, as is clear from Fig. 17. When the slide returns to its retracted position (Fig. 20) the capsule drops through the hole in the slide onto the floor plate 169; and upon the next forward movement of the slide, the capsule is carried beyond the end of the floor plate, and is dropped therefrom into a gate mechanism the purpose of which is to drop the capsule through a feeding chute 170 to the capsule-receiving holes in the disks 52 and 53 at the position A.

The gate which receives each capsule as it is discharged from the floor plate 169 comprises two relatively movable members 171 and 172 which extend longitudinally of the capsule at each side thereof and which are adapted to move relatively toward and away from each other. In the device shown in the drawings, the gate member 171 is stationary, and the gate member 172 is movable. For this purpose, the gate member 172 is formed as a lip on a pivotally mounted part 173 which is adapted to be swung periodically about its axis of oscillation by a bell-crank 174, to which the part 173 is connected by means of a link 175. The bell-crank 174 is adapted to be actuated by means of a push rod 176 associated with the cam 126 on the cam shaft 122. A spring 177, acting on the bell-crank 174, tends normally to move the part 173 to cause the lip 172 to approach the fixed gate member 171. An adjusting screw 178 carried by the part 173 and adapted to abut against the side of the chute 170 may be employed to limit movement of the part 173 under the influence of the spring 177.

When the push rod 176 is moved upward by the cam 125, the resultant movement of the bell-crank 174 causes the part 173 to swing to carry the movable gate member 172 in a direction away from the fixed gate member 171.

The gate members and the capsule associated with them are shown on an enlarged scale in Figs. 22 to 24 inclusive. The gate members are formed so that their edges which retain and support the capsule are spaced farther apart near the center of the gate members than near the ends thereof. In addition, the capsule-supporting edges of the gate members are symmetrical about their mid-points. In the construction shown in Figs. 22 and 24, this is accomplished by inclining the cap-supporting edges of the gate members toward each other from an approximately central point.

In Fig. 22, the gate members are shown in the positions they occupy when they receive a capsule. So long as the gate members occupy the relative positions shown in Fig. 22, the capsule will remain supported. When the gate member 172, however, moves away from the gate member 171, support of the capsule near the middle thereof is withdrawn by reason of the greater spacing of the edges of the gate member at this point. As a result, the capsule is supported at or near its ends, the middle being free from support. As movement of the gate member 172 away from the gate member 171 continues, a point is eventually reached where the capsule-body is permitted to drop downwardly between the gate members while the cap, by reason of its larger diameter, is still retained. Because of the inclination of the cap-supporting edges of the gate members, the point of support of the cap is displaced from the center of gravity of the capsule and is near the closed end of the cap. As a result, the capsule swings downwardly about its point of support as indicated in Fig. 24. Eventually, the two gate members 171 and 172 separate sufficiently far to remove all support from the capsule, which then drops through the chute 170 into the capsule-receiving opening in the plate 53.

It is evident that when the capsule leaves the gate members 171 and 172 its cap-end will be up and its body-end will be down irrespective of the position which the capsule originally occupies while supported by the gate members. In Figs. 22 to 24 inclusive, the capsule is indicated in full-lines as having been received upon the gate members with its cap-end to the left; and as the support provided by the gate members is removed first from the smaller-diameter right-end of the capsule, that end swings downward as is indicated in full lines in Fig. 24. Should the capsule be delivered to the gate with its cap-end to the right, the left-end of the capsule would swing downward as indicated by the dotted lines in Fig. 24.

Instead of forming the gate members with their cap-supporting edges inclined as in Figs. 22 to 24, we may notch the cap-supporting edges of the gate members near the center as indicated in Figs. 25 to 27. If this is done, the device works in substantially the same manner; as in both devices the gates are so formed that support is removed from near the center of the capsule while the capsule is still supported at or near its ends.

At the time the gate members open to drop a capsule, the two disks 52 and 53 have come to rest and capsule-receiving holes in such disks are in line with the opening of the air passage 151. As a result, there is a certain downward flow of air through the gate and feed-chute 170, and this flow of air assists the action of gravity in drawing the capsule downward.

Desirably, some means is provided for stopping the machine in event of any continued interruption in the feeding of the capsules to the index plates. To this end, we provide in the circuit of the motor 44 a control switch 180 (Fig. 2), and we provide in association with the capsule-feeding device 55 means for opening this switch in the event that capsules are not fed to the index plates for two successive cycles.

The switch 180 is conveniently of the tumbler type and is adapted to be opened by means of a longitudinally slidable member mounted in the body 161 of the feed device. Such longitudinally sliding member may conveniently be the floor plate 169, which extends rearwardly beyond the cap 166, as indicated in Figs. 19 and 20. Near its rear end, the plate 169 may be provided with a stop or abutment 181 adapted to co-operate with a second abutment 182 carried by the slide 162 of the feed device. (See Figs. 28, 29, and 30.) The abutment 182 is conveniently carried by an arm 183 pivotally mounted on the slide 162. On the arm 183 we provide a roller 184 which rolls on and is supported by an arm 185 pivotally mounted on the body 161 of the feeding device. Normally, the parts just described occupy the full-line positions shown in Fig. 28, the plate 169 being held in advanced position as by means of a spring 169', and the abutment 182 being supported above the abutment 181 by means of the engagement of the roller 184 with the arm 185. The slide 162 may therefore reciprocate without disturbing the plate 169. Should the arm 185, however, be dropped from the full-line to the dotted-line position shown in Fig. 28, the abutment 182 drops down to a position where it may engage the abutment 181 on the plate 169, and on the next rearward movement of the slide 162, the plate 169 is carried with it and engages the operating member of the switch 180 to stop the operation of the machine. The rearward position of the slide 162 and plate 169 is illustrated in Fig. 30.

For the purpose of controlling the vertical position of the arm 185, we may mount pivotally upon the body 161 of the feeding device an arm 187 provided with an abutment 188 adapted to support the arm 185. Near the free end of the arm 187 we provide two downwardly extending bosses 189 which are located on the pitch-line of the holes in the disk 53, as is clear from Fig. 32. The bosses 189 are so shaped that they may drop into adjacent holes in the disk 53 if there are no capsules in such holes, as is clear from Fig. 30. During the time when the disk 53 is moving and the bosses 189 are not in alinement with two capsule-receiving holes in the disk 53, the bosses are supported by the upper surface of such disk in the full-line position shown in Fig. 28. The shoulder 56 which retains the capsule-cap in each of the holes of the disk 53 is so located with respect to the length of the capsule-cap that the tops of the caps are substantially flush with the upper surface of the disk, as is clear from Fig. 17. As a result, when a capsule is present in either of the two holes with which the bosses 189 are alined, the arm 187 is held in its upper position as shown in Fig. 17.

Should the feed device 55 fail to feed a capsule for two successive cycles, the two holes which should have received such capsule will come into alinement with the bosses 189, and such bosses will be permitted to drop into the holes as shown in Fig. 30. This resulting downward movement of the arm 187 causes the arm 185 to be lowered, and also causes the engagement of the abutments 181 and 182, so that on the next rearward movement of the slide 182 the switch 180 will be opened to stop the machine.

Because of the fact that there are two of the projections 189, automatic stopping of the machine requires a failure in capsule-feed for two successive cycles, as the arm 187 will be in its upper position if either of the bosses 189 is supported by a capsule. Should it be desired to stop the machine automatically upon the failure of the capsule-feed for only one cycle, only one of the bosses 189 would be used.

As interruptions in the capsule-feed, which result in stopping the machine through the mechanism just described, are usually caused by jamming of capsules in the gate or in the feed chute 170. We prefer to construct these parts so that they will be readily accessible when automatic stoppage of the machine occurs. To this end, the feed chute 170 may be made in two parts, the rear part being pivotally mounted near its upper end in the body 161, as is clear from Figs. 19 to 21. Acting on the movable rear half of the feed chute, we may provide a spring 195 (Fig. 29) which normally holds the rear chute-half against the stationary front chute-half. The rear half of the chute can be swung rearwardly around its axis of pivotal mounting to the position shown in Fig. 21 thus opening the chute and permitting the readily removal of any capsules.

For the purpose of opening the chute when automatic stoppage of the machine occurs, we may mount on the slidable floor plate 169 a forwardly extending arm 196 which is provided with a shoulder 197 adapted to engage a pin 198 on the rear half of the feed chute 170. When the floor plate 169 is moved rearwardly following an interruption of capsule-feed for two successive cycles the arm 196 moves with it, and the shoulder 197, engaging the pin 198, moves the rear half of the feed chute 170 to its open position as indicated in Fig. 21.

Desirably, we also provide means for automatically opening the gate when automatic stoppage of the machine occurs. To accomplish this, the swinging gate member 173 is provided with a downwardly extending tail-piece 199 which is located behind a finger 200 on the arm 196. With such a construction, when the floor plate 169 moves rearwardly, the finger 200 engages the tail piece 199 and swings the gate member 173 to the position shown in Fig. 21.

It is frequently desirable in setting the machine to provide some means for operating it by hand, and for this purpose we provide a rotating hand wheel 205 (Fig. 2). The hand wheel 205 is rotatable with a shaft 206 mounted in a suitable bearing in the frame 40 and co-axial with the shaft 93. At its inner end, the shaft 206 has fixed upon it a jaw-clutch member 207 adapted to co-operate with a second jaw-clutch member 208 rigidly mounted upon the end of the shaft 93. The hand-wheel shaft 206 is axially slidable in its supporting bearing, and is normally held outwardly by a spring 209 in a position such that the two clutch members 207 and 208 are out of engagement. Thus, when the machine operates under power, the hand-wheel 205 remains stationary although the shaft 93 is rotated. When it is desired to operate the machine by hand, the clutch 96 is disengaged, the handwheel 205 and shaft 206 are moved inwardly against the force exerted by the spring 209 to cause engagement of the clutch members 207 and 208, and the hand wheel is then rotated to cause operation of the machine.

We claim as our invention:

1. In a capsule-filling machine, two overlapping disks rotatable about parallel axes, one of said disks being provided with a circumferential series of holes adapted to receive capsule-caps and the other with a circumferential series of holes adapted to receive capsule-bodies, means for rotating said disks intermittently, said disks, holes, and rotating means being arranged so that when the disks are at rest two cap-receiving holes will be alined with two body-receiving holes, feeding mechanism for feeding an assembled capsule to one pair of alined holes when the disks are at rest, means for separating the capsule-cap and body to leave the cap in the first disk and the body in the second, means for filling the capsule bodies as they are carried between the positions in which they are separated from the caps to the other position in which holes in both disks are alined, and means at said other position for joining and ejecting the capsules.

2. In a capsule-filling machine, two overlapping disks rotatable about parallel axes, one of said disks being provided with a circumferential series of holes adapted to receive capsule-caps and the other with a circumferential series of holes adapted to receive capsule-bodies, means for rotating said disks intermittently, said disks, holes, and rotating means being arranged so that when the disks are at rest a cap-receiving hole will be alined with a body-receiving hole, automatic means for disposing capsule-caps and bodies in the holes of the two disks, means for filling the capsule-bodies while they are supported in the holes in their associated disk, and means located at the position where holes in both disks are alined for joining and ejecting the filled capsule.

3. In a capsule-filling machine, two carrying members adapted respectively to support and carry capsule-bodies and caps, means for separating capsules and for disposing capsule-bodies in one carrier and caps in the other, mechanism for automatically moving said carriers to carry the capsule-bodies and caps over independent paths and to bring the bodies successively into alinement with the caps, means for filling the capsule-bodies, and means located at the position where capsule-bodies come successively into alinement with caps for joining each capsule and ejecting it from the carriers.

4. In a capsule-filling machine, two carriers, one of said carriers being provided with a series of holes adapted to receive capsule-caps and the other with a series of holes adapted to receive capsule-bodies, said carriers being movable to carry the caps and bodies over independent paths which cross at two points, means at one of such points for successively disposing capsule-caps in one carrier and capsule-bodies in the other, and means located at the other of such points for joining and ejecting capsules from the carriers.

5. In a capsule-filling machine, a carrier for capsule-bodies, said carrier having one or more vertical, open-bottomed holes adapted respectively to receive capsule-bodies, means for moving said carrier in a horizontal plane, and a stationary track located below said holes to prevent capsule-bodies dropping therefrom, said track being narrower than the diameter of said holes, said track also being free of underlying support over a substantial portion of its length, whereby material passing through said open-bottomed holes may fall free of said track and be prevented from accumulating thereabout.

6. In a capsule-filling machine, feeding mechanism for feeding assembled capsules, comprising a pair of horizontal members having their end portions relatively closer than their midportions and adapted to support a capsule at points near both its ends, said members being relatively movable away from each other and laterally of the capsule, whereby support may first be removed from the smaller-diameter capsule-body and then from the capsule-cap so that the body-end of the capsule may swing downward before support is removed from the cap.

7. In a capsule-filling machine, feeding mechanism for feeding assembled capsules, comprising a pair of horizontal members having their end portions relatively closer than their mid-portions and adapted to support a capsule at points near both its ends, said members being relatively movable away from each other, whereby support may first be removed from the smaller-diameter capsule-body and then from the capsule-cap so that the body-end of the capsule may swing downward before support is removed from the cap.

8. The invention set forth in claim 6 with the addition of a device for supplying capsules successively to said feeding mechanism, and means for automatically separating said members after a capsule has been supplied to them.

9. The invention set forth in claim 7 with the addition of a device for supplying capsules successively to said feeding mechanism, and means for automatically separating said members after a capsule has been supplied to them.

10. A feeding device for capsules, comprising a pair of members between which each capsule is to pass, the adjacent edges of said members being shaped to present their ends relatively closer together than their mid-portions, said members normally being close enough to each other to engage an assembled capsule near both its ends to prevent the passage of either end between said two members, said two members being relatively movable to permit first the capsule-body and second the capsule-cap to pass between them.

11. A feeding device for capsules, comprising a pair of members between which each capsule is to pass, the adjacent edges of said members being shaped to present their ends relatively closer together than their mid-portions, said members normally being close enough to each other to engage an assembled capsule to prevent the passage of either end thereof between said two members, said two members being relatively movable to permit first the capsule-body and second the capsule-cap to pass between them.

12. In a capsule-filling machine, a feeding pocket having an opening in one wall and adapted to contain material with which the capsules are to be filled, a carrier for capsule-bodies to be filled, means for moving said carrier intermittently to present the capsule bodies successively to said pocket-opening, a tamper reciprocable in said pocket in alinement with said opening to force material through such opening into the adjacent capsule-body, means for periodically pressing said tamper toward said opening, yielding means for returning it, and an adjustable stop for limiting such return movement.

13. In a capsule-filling machine, a feeding pocket having an opening in one wall and adapted to contain material with which the capsules are to be filled, means for presenting the capsule bodies successively to said pocket-opening, a tamper reciprocable in said pocket in alinement with said opening to force material through such opening into the adjacent capsule-body, means for periodically pressing said tamper toward said opening, yielding means for returning it, and an adjustable stop for limiting such return movement.

14. In a capsule-filling machine, a device for feeding capsules, a chute into which said feeding device discharges capsules, said chute being divided longitudinally into two parts relatively movable between open and closed position and biased toward closed position, and means for automatically opening said chute in event of a failure of said capsule-feeding device to feed capsules.

15. In a capsule filling machine, the combination with capsule delivering mechanism, material feeding mechanism and rejoining and ejecting means, of a pair of rotatable tables peripherally overlapping and provided with capsule receiving apertures, the apertures of the upper table having capsule cap arresting means and the apertures of the lower table having capsule body arresting means, said tables being rotated in timed relation whereby the capsules are received in the apertures of the upper table, the capsules unjoined and the bodies deposited in the apertures of the lower table, the bodies presented under the material feeding means, again brought into registration with the caps and rejoined by said rejoining mechanism.

16. In a capsule filling machine, two overlapping disks rotatable about parallel axes, one of said disks being provided with a series of capsule-cap receiving holes and the other with a series of the same number of capsule-body receiving holes, means for intermittently rotating said disks in opposite directions between periods of rest in which a cap-receiving hole is alined with a body receiving hole at each of two stations, means for feeding an assembled capsule to each successive pair of alined holes at one station and separating it to dispose its cap and body in the respective cap and body receiving holes, means for filling capsule bodies during their travel between the two stations, and means at the second station for re-assembling and ejecting said capsules.

17. In a capsule filling machine, the combination with capsule righting mechanism, material feeding mechanism, and capsule rejoining and ejecting means, of means including a pair of overlapping oppositely rotatable disks acting to successively receive a capsule from said righting mechanism, unjoin said capsule, present the body of the capsule to the material feeding mechanism, and present the filled body and its cap in alined relation to the rejoining and ejecting means.

18. In a capsule filling machine, the combination with capsule delivering mechanism, material feeding mechanism and capsule joining and ejecting mechanism, of a pair of oppositely rotatable disks arranged in overlapping relation and formed with capsule receiving holes, said holes being spaced and said disks being rotated in timed relation whereby capsules are successively deposited in alined holes and unjoined to deposit the capsule cap in one disk and the capsule body in the other, said body is presented to said feeding mechanism and brought into re-alinement with its cap in operative position with relation to said joining and ejecting mechanism.

19. In a capsule filling machine, capsule handling mechanism including a pair of relatively movable plates, each plate being provided with a series of holes, the holes in one plate being adapted to retain the caps of the capsules and those in the other plate being adapted to receive the bodies of the capsules, means for relatively moving said plates about different axes to bring each hole in one plate into registry with the same hole in the other plate at each of two stations, capsule-unjoining mechanism at one of said stations, capsule-rejoining mechanism at the other of said stations, and capsule body filling means between said two stations in the path traversed by said body-retaining holes in their movement from the unjoining station to the rejoining station.

20. In a capsule filling machine, a carrier provided with holes for receiving capsule caps, a second carrier provided with holes for receiving capsule bodies, means for successively bringing cap-retaining holes into alinement with body-retaining holes, a wall having an opening adapted to overlie said alined holes, a plunger movable through said alined holes, and operating means adapted to position said opening out of registry with said holes and advance said plunger and subsequently to bring said opening into registry with said holes and further advance said plunger, whereby a capsule cap and a body in said holes are pressed together against said wall by the first movement of said plunger and ejected through said opening by its further movement.

21. In a capsule-filling machine, two overlapping disks rotatable about parallel axes, a circumferential series of capsule-cap receiving holes in one of said disks, a similar series of capsule-body receiving holes in the other of said disks, means for rotating said disks between periods of rest in which a cap-retaining hole is alined with a body retaining hole, a trough overlying said alined position and provided with an opening in its wall adapted to register with said alined holes, a plunger movable through said alined holes toward said trough, and means operating during said period of rest to position said opening out of registry with said holes and advance said plunger and subsequently to bring said opening into registry with said holes and further advance said plunger, whereby a capsule cap and a body in said holes are pressed together against the wall of said trough by the first movement of said plunger and ejected through said opening by its further movement.

22. In a capsule-filling machine, two overlapping disks rotatable about parallel axes, a circumferential series of capsule-cap receiving holes in one of said disks, a similar series of capsule-body receiving holes in the other of said disks, means for rotating said disks between periods of rest in which a cap-retaining hole is alined with a body retaining hole at each of two stations, means for feeding assembled capsules to said holes at one station and separating them, means for filling capsule bodies during their travel between said two stations, a trough adapted to overlie the alined holes at the other station and provided with an opening in its wall adapted to register with said alined holes, a plunger movable through said alined holes toward said trough, and means operating during said period of rest to position said opening out of registry with said holes and advance said plunger and subsequently to bring said opening into registry with said holes and further advance said plunger, whereby a capsule cap and a body in said holes are pressed together against the wall of said trough by the first movement of said plunger and ejected through said opening by its further movement.

23. In a capsule filling machine, a member having a hole for containing a capsule body, a second member having a hole for containing a capsule cap, means for bringing said holes into registry, a wall having an opening arranged to overlie said registered holes, a plunger movable through said registered holes toward said wall, and means to position said opening out of line with said holes and advance the plunger to join a capsule, and then to position said opening in line with said holes and further advance said plunger to eject said capsule.

24. In a capsule filling machine, the combination with capsule body filling mechanism, capsule cap and body carriers, and means for periodically feeding assembled capsules and unjoining them to deposit capsule caps in one carrier and capsule bodies in the other carrier, of means operable upon the completion of a capsule feeding operation to stop said machine, and means actuated by a carrier-supported capsule-part for preventing the operation of said stopping means.

25. In a capsule-filling machine, capsule filling mechanism, means for feeding assembled capsules and unjoining them, carriers for receiving capsule-parts and presenting capsule bodies to said filling mechanism, said carriers being operated intermittently between periods of rest, means normally operative during such periods of rest for stopping said machine, and means including a member adapted to be changed in position by the presence in a carrier of a part of a capsule whose body is being carried to said filling mechanism for preventing the operation of said stopping means.

26. In a capsule filling machine, carriers for capsule-parts, means for feeding assembled capsules and separating them to dispose their respective parts in said carriers, means operated in synchronism with said feeding means for stopping said machine, and a member adapted to be actuated by a capsule part as it leaves said feeding means for preventing one or more operations of said stopping means.

27. In a capsule filling machine, a pair of overlapping rotatable disks, one of said disks being provided with a series of holes for retaining capsule caps, the other having a series of holes for retaining capsule bodies, means for rotating said disks intermittently between periods of rest during which a hole in one disk is alined with a hole in the other disk at each of two stations, means at one of said stations for feeding assembled capsules to the alined holes and separating such capsules to dispose the cap and body in the respective cap and body retaining holes, a member adapted to be held in one position during each period of rest by a capsule-cap in a cap-retaining hole and permitted to take another position in the event such cap-retaining hole contains no cap, and mechanism responsive to the position of said member for stopping said machine when said member takes said other position.

28. In a capsule filling machine, a pair of overlapping rotatable disks, one of said disks being provided with a series of holes for retaining capsule caps, the other having a series of holes for retaining capsule bodies, means for rotating said disks intermittently between periods of rest during which a hole in one disk is alined with a hole in the other disk at each of two stations, means at one of said stations for feeding assembled capsules to the alined holes and separating such capsules to dispose the cap and body in the respective cap and body retaining holes, and means responsive to an empty hole in a disk for stopping said machine.

29. In a capsule filling machine, a pair of overlapping rotatable disks, one of said disks being provided with a series of holes for retaining capsule caps, the other having a series of holes for retaining capsule bodies, means for rotating said disks intermittently between periods of rest during which a hole in one disk is alined with a hole in the other disk at each of two stations, means at one of said stations for feeding assembled capsules to the alined holes and separating such capsules to dispose the cap and body in the respective cap and body retaining holes, and means responsive to two successive empty holes in a disk for stopping said machine.

30. The combination in a capsule filling machine having means for feeding capsule-parts to a series of holes in a carrier, of means operated conjointly with said feeding means for stopping said machine after each feeding operation, and an arm having a pair of bosses disposed to overlie two successive holes in said carrier and to be raised when either or both of said holes contains a capsule part, said arm when in raised position acting to prevent the operation of said stopping means.

31. In a capsule filling machine, a hopper for containing filling material, a pocket in the wall thereof, stirring means adapted to cause said pocket to be filled with such material, said pocket having two opposite walls standing outwardly from the adjacent hopper wall, alined holes in said pocket walls, means for successively presenting capsule-bodies to one of said holes, and a tamper extending through the other hole and reciprocable in said pocket to force material through said first mentioned hole into the adjacent capsule body.

32. In a capsule filling machine, a hopper for containing filling material, a pair of pockets in the wall thereof, stirring means adapted to cause said pockets to be filled with such material, each of said pockets having two opposite walls standing outwardly from the adjacent hopper wall, alined holes in the said walls of each pocket, means for successively presenting capsule-bodies to a hole in each of said pockets, a tamper extending through the other hole in each pocket and reciprocable to force material through the first mentioned hole into the adjacent capsule-body, and means for independently limiting the movement of each said tamper away from said first mentioned hole to control the amount of material forced into each capsule by such tampers.

33. In a capsule-filling machine, a capsule-receiving device, mechanism for feeding capsules successively to said capsule-receiving device, a source of power for operating said machine, and means for automatically stopping said machine upon two successive failures of said feeding mechanism to deliver capsules to said capsule-receiving device, said means being inoperative to stop the machine upon a single failure of said feeding mechanism.

34. In a capsule-filling machine, a container for material with which the capsules are to be filled, said container having an opening in one wall, a carrier for capsule-parts to be filled, means for moving said container to present such capsule parts successively to said opening, a tamper reciprocable in alinement with said opening to force material therethrough into the adjacent capsule-part, means for reciprocating said tamper in timed relation to the movement of said carrier, and provisions for regulating the distance through which said tamper reciprocates to control the amount of material forced into each capsule-part.

35. In a capsule filling machine, a hopper for containing filling material, a pocket disposed exteriorly of and at one side of said hopper, said pocket opening laterally into said hopper at the bottom thereof, stirring means adapted to move such material horizontally into said pocket, said pocket being of a height less than said hopper and having aligned holes in its top and bottom walls, and a reciprocable tamper extending through the hole in the upper wall of said pocket and reciprocable to force material through the hole in the lower wall of said pocket and into a subjacent capsule body.

36. In a capsule filling machine, a hopper for containing filling material, a pocket at one side of said hopper at the bottom thereof and opening laterally thereinto, stirring means for moving filling material in said hopper horizontally into said pocket, a hole in the bottom of said pocket, means for successively presenting capsule bodies below said hole, a tamper reciprocable through said pocket to force material through such hole into a subsequent capsule body, means for reciprocating said tamper, and an adjustable stop for regulating the upward movement of said tamper to control the amount of material forced into the capsule body.

WILLIAM A. HANLEY.
BRUCE T. CHILDS.

CERTIFICATE OF CORRECTION.

Patent No. 1,993,716. March 5, 1935.

WILLIAM A. HANLEY, ET AL.

It is hereby certified that error appears in the printed specification of the above numbered patent requiring correction as follows: Page 5, second column, line 73, for "170. We" read 170, we; and page 9, second column, line 40, claim 36, for "subsequent" read subjacent, and that the said Letters Patent should be read with these corrections therein that the same may conform to the record of the case in the Patent Office.

Signed and sealed this 16th day of April, A. D. 1935.

(Seal)

Leslie Frazer
Acting Commissioner of Patents.